United States Patent [19]

Cain et al.

[11] Patent Number: 5,232,731
[45] Date of Patent: Aug. 3, 1993

[54] PROTEIN DISPERSIONS IN FOOD PRODUCTS

[75] Inventors: Frederick W. Cain, Voorburg; Maurizio Decio; Bertus M. van Bogegom, both of Vlaardingen; Hubertus C. van Gastel, Zwijndrecht; Johannes Visser, Maassluis, all of Netherlands

[73] Assignee: Van den Bergh Foods Co., Division of Conopco, Inc., Lisle, Ill.

[21] Appl. No.: 733,500

[22] Filed: Jul. 22, 1991

[30] Foreign Application Priority Data

Jul. 23, 1990 [EP] European Pat. Off. ........ 90201987.6
Aug. 9, 1990 [EP] European Pat. Off. ........ 90202164.1

[51] Int. Cl.⁵ .............................................. A23C 21/06
[52] U.S. Cl. ..................................... 426/580; 426/38; 426/41; 426/42; 426/43; 426/491; 426/583; 426/603; 426/656
[58] Field of Search ................... 426/491, 583, 38, 41, 426/42, 43, 580, 656, 603

[56] References Cited

U.S. PATENT DOCUMENTS

| | | | |
|---|---|---|---|
| 4,265,924 | 5/1981 | Buhler et al. | 426/491 |
| 4,308,294 | 12/1981 | Rispoli et al. | 426/603 |
| 4,713,254 | 12/1987 | Childs et al. | 426/491 |
| 4,734,287 | 3/1988 | Singer et al. | 426/41 |
| 4,948,599 | 8/1990 | Sagara et al. | 426/491 |
| 5,028,589 | 7/1991 | Braie et al. | 426/491 |

FOREIGN PATENT DOCUMENTS

| | | |
|---|---|---|
| 344651 | of 0000 | European Pat. Off. . |
| 345226 | of 0000 | European Pat. Off. . |
| 240326 | 1/1988 | European Pat. Off. . |
| 0345226 | 12/1989 | European Pat. Off. . |
| 2224096 | 6/1974 | France . |
| 2247168 | 6/1975 | France . |
| 2050797 | of 0000 | United Kingdom . |
| 2063273 | 6/1981 | United Kingdom . |

OTHER PUBLICATIONS

Dagher, S. et al. Journal of Food Protection 48 (1985) 300–302.
European Search Report EP 91 20 1626.
FSTA Journal 88048136.
J. Food Protection 48 (1985) 300–302.
Encyclopedia of Quark Specialties 1985.

Primary Examiner—Jeanette Hunter
Assistant Examiner—Helen Pratt
Attorney, Agent, or Firm—Gerard J. McGowan, Jr.

[57] ABSTRACT

The invention concerns casein-containing dispersions, mixed with denatured protein containing compounds. The pH of the mixture is 4.8–5.2, which pH is regulated by stopping of the milk fermentation by heating. The dispersions can be used as a fat replacer in food products such as dressings, toppings, mayonnaises, frozen deserts, cheese products, and spreads.

18 Claims, No Drawings

PROTEIN DISPERSIONS IN FOOD PRODUCTS

In the last years it has become common practice to use low amounts of fats in food products. Therefore quite a lot of fat replacers have been developed, which can be used in food products in order to replace at least part of the fat, normally present in the food product. These fat replacers must give a fatty mouthfeel, whereas they also must take over the fat functionality of the fat in the food products.

Compounds from which it is stated in the prior art to meet these requirements are e.g. polyol fatty acid polyesters and non-aggregated denatured proteins with a specific particle size distribution. Recently the use of substantially non-aggregated casein micelles as fat replacer in food products has been described (EP 345 226). These casein containing products are obtained from skim milk, preferably from ultrafiltered skim milk. Through the ultra filtration most of the lactose is removed from the casein product. In order to obtain non-aggregated casein micelles it is essential that the pH remains above 5.6. Below pH 5.6 aggregation of the micelles occurs. In this EP application nothing is said about the use of aggregated casein micelles obtained from yoghurt or quark.

In EP 344 651 a method is disclosed for the preparation of edible products, in particular breadspreads, in which a mixture of a dewatered quark or yoghurt and an unsaturated oil is used. In this application, however, nothing is said about the ratio of protein: lactose in the dewatered product. As the yoghurt or quark is not heated the dewatered product will contain live microorganisms, which will cause that the pH of the product is always about 4.0. Moreover nothing is disclosed about the use of this dewatered product in frozen dessert.

In Food Microstructure vol. 2 (1983) pages 51–66 a yoghurt product is described with a dry matter content of 10–15% and a pH=4.0. This product is obtained by centrifuging a yoghurt. The product shows a casein to non-casein protein ratio of about 4.6:1 to 1.1:1.

From EP 240 326 soft ice compositions are known, wherein a dried natural yoghurt powder, containing live bacilli, is present. The dried natural yoghurt powder can be obtained by known methods. Nothing is disclosed about the pH of such a composition. As these yoghurt powders are obtained from natural yoghurt with a pH=4.1–4.6, the pH of the dried powder will most probably be in the same range. Another consequence of the use of dried, natural yoghurt will be that the lactose: casein ratio in the dried product will be the same as in the natural yoghurt. Therefore the use of these dried products in food products, e.g. in frozen dessert will automatically lead to the introduction of quite a lot of lactose in the frozen dessert, will all the known disadvantageous effects.

From U.S. Pat. No. 4,307,123 it is known to prepare dry freezer mixes, which are preparable with water. In these mixes 1,5–20% of a protein source is present. This protein source can be yoghurt solids prepared by fermentation of a milkcompound. These proteins do not necessary contain live active cultures and can have a bland taste. However in this specification only the use of a yoghurt-like protein source, in the form of a dried yoghurt solid, mixed with corn syrup solids, as available from Stauffer Chemical Company, is disclosed. We have now found new casein containing products, that show very good properties as a fat replacer, e.g. the fatty mouthfeel of these products is excellent. These products can be used in a number of food products wherein it can replace at least part of the fat normally present in the food product. The product according to this invention therefore comprises a concentrated casein containing dispersion of substantially aggregated casein, preferably obtained from yoghurt and/or quark, which dispersion has a dry matter content of 10–80, preferably of 10–40% wt %, a pH of 4.8–5.2, whereas the weight ratio protein:lactose in the dispersion varies from 2.1 to 10:1, and the dispersion is free from live, milk fermenting bacteria. Preferred dry matter contents are 12 to 20 wt %. A useful product is obtained, when the pH of the dispersion is 4.9–5.1. This product does not show an acidic taste. Although the weight ratio protein:lactose can vary between 2:1 and 10:1, we prefer to use weight ratios of 2.5:1 to 6:1, most preferably 3:1 to 5:1.

Another product according to the invention comprises a mixture of a concentrated casein containing dispersion especially obtained from yoghurt or quark of substantially aggregated casein, which dispersion has a dry matter content of 10–80 wt %, preferably 10–40 wt %, a pH of 4.8–5.2, whereas the weight ratio protein:-lactose in the dispersion varies from 2.1 to 10:1 which dispersion is free from live, milk fermenting bacteria and a denatured protein particles containing aqueous dispersion that contains particles with a mean particle size, when measured dry of more than 0.6 $\mu$m. More preferably the mean particle size of the denatured protein is more than 1.5 $\mu$m, in particular 2.0–20 $\mu$m, when measured according to the technique described in EP 250 623 or EP 323 529.

Although in the yoghurt or quark dispersion the weight ratio protein:lactose can vary between 2:1 and 10:1, we prefer to use weight ratios of 2.5:1 to 6:1, most preferably 3:1 to 5:1.

The taste of the denatured, non-aggregated protein particles with a particle size, that is unsuitable for organoleptic purposes according to EP 250 623, because of the large particle size, is improved by mixing those particles with the concentrated yoghurt or quark. Therefore good results are obtained, when the concentrated yoghurt or quark and the denatured protein product are first made separately, after which the fractions are mixed.

The mixing of the two fractions should be done in such a way that the dry matter content of the mixed product is 10–20 wt %. This can be achieved by a) mixing of a concentrated yoghurt or quark with a high dry matter content (40–80 wt %) with a denatured protein containing dispersion with a relatively low dry matter content (5–20 wt %) or b) mixing of a concentrated yoghurt or quark with a relatively low dry matter content (10–25 wt %) with a nearly dry denatured protein containing product, as can be obtained from the protein dispersion as is described in our patent application EP 90200018.1. Of course it is also possible to mix two fractions with dry matter contents in accordance with that of the desired end product.

Another way to come to the desired product is by mixing first of natural yoghurt or quark with the denatured protein containing dispersion and than removing a part, preferably at least 40% of the water, until in the end product the required ratio lactose:casein for the yoghurt or quark fraction is obtained.

However, the best results are obtained when the denatured protein dispersion is added to the milk product before it is fermented, then adding the bacteria culture and fermenting the mixture. After separation of part of the waterlayer, e.g. by centrifugation a mixture according to the invention is obtained, consisting mainly of concentrated casein and denatured protein. The ratio in which the two fractions can be mixed can vary considerably. As long as the ratio of casein to non-casein protein in the end product is between 0.3 and 3.0 an useful end product is obtained.

The product according to the invention cannot be made by first mixing a yoghurt or quark fraction into an undenatured protein containing solution and than heating the mixture to denature the protein.

In addition to the components present in our dispersions we prefer to use a gelling agent in our casein-containing dispersions. Preferred gelling or stabilising agents are kappa- and iota carrageenan, gelatin, gelling starch, xanthangum, alginate, agar, gellan, pectin, cellulose powder. The gelling agent is preferably added to the fermented product before it is heated in order to stop the fermentation.

The mixtures can be used in several food products. Excellent frozen desserts, toppings, dressings, cheese-products mayonnaises, low fat spreads and zero fat spreads are obtained by incorporating into the products of 2 to 90 wt % of the casein, or casein and denatured protein containing dispersions.

Especially by incorporation of 2-60 wt % of the casein dispersions in toppings, toppings with excellent properties are obtained. Similarly the dressings contain preferably 5 to 50 wt % of the dispersion, the mayonnaises 5 to 60 wt %, the low fat spreads 5 to 80 wt % and the zero fat spreads 5 to 90 wt %. The frozen dessert can contain 2-85 wt % of this dispersion.

The dispersions of concentrated, substantially aggregated casein micelles can easily be obtained from milkproducts by adding milk fermenting bacteria, e.g. Lactobacillus bulgaricus, Lactobacillus acidophilus, Bifido bacteria Langem, Bifido bacteria breve, S. cremoris, S. diacetylactus, S. lactus, Leuconostoc cremoris, or S. thermophilus, to the milkproduct, fermenting the milk at normal temperature conditions (32°-42° C.) until the pH=4.8-5.2, stopping the fermentation by heating the fermented milk above 70° C. and removing 45 to 75% on weight basis of the water layer of the fermented product. This last step can be performed by centrifugation or ultra filtration of the fermented product. The fermentation is preferably stopped at pH=4.9-5.1. As fermenting agent also mixtures of yeasts and the above mentioned bacteria can be used. As has been disclosed above the fermentation can also be performed in the presence of denatured (whey) protein particles.

For the centrifugation an MSE-coolspin centrifuge can be used. Centrifugation times being 10–45 minutes at 3,500–7,000 rpm (RCF: about 5000 g).

When ultra filtration is applied, this should be carried out using a membrane that passes lactose, water and other soluble milk products, whereas the casein micelles are retained. A membrane with a rating of 8,000-15,000 Daltons is very suitable.

In this separation process at least 40 wt % of the lactose originally present in the yoghurt or quark is removed via the water layer.

It is also possible to prepare a casein dispersion with a pH=4.8-5.2 by the following process:

1) wash a casein dispersion with pH 4.0-4.6 with skimmed milk 2) concentrate it by centrifugation to 20-60% of its original weight 3) wash it with water 4) concentrate it to 15-80% of its original weight.

In this way a product can be obtained that does not show the particular acidic taste of yoghurt, when the pH of the yoghurt or quark is adjusted to 4.8-5.2 before the centrifugation takes place. However, the pH decreases again, because of a fermentation that can perform as live bacteria are still present in the product.

The invention also concerns the use of aggregated casein containing dispersions in food products wherein the casein dispersion according to the invention are used as fat replacer in toppings, dressings, mayonnaise, low fat spreads, zero fat spreads, cheese products, or frozen desserts.

The processing for the manufacturing of the different products is illustrated with the following examples:

EXAMPLE I

Preparation of casein-dispersion

A. Fat free yoghurt was centrifuged in a MSE coolspin centrifuge for 30 min. at 4200 rpm. 50% whey was decanted from the yoghurt. This led to a product with the following characteristic:

| | |
|---|---|
| visc. (Pa · s) | 2.25 |
| % dry matter | 12 |
| pH | 4.0 |
| D 3.2 | 1.8 |

The pH of this product was adjusted by adding skim milk (<1% fat) in an amount that was about equal to the amount of concentrated yoghurt. The pH of this product was 4.9. The mixture obtained was centrifuged again to a d.m. content of 15%. The product was stored at 0.5° C. The product displayed a sweet/cheesy taste. After storage for 1 week at 0.5° C. the pH of the product was 4.4, whereas the viscosity was now at 20° C.:160 (Haake VT 02). This product still had a sweet/cheesy taste, however the mouthfeel was quite dry/chalky. Some noticeable lumps were present in the product.

To skimmed milk a culture of Lactobacillus bulgaricus was added. The milk was fermented at 40° C. During the fermentation the pH was measured. The moment a pH of 5.0 was reached, 0.1 wt % of xanthan gum was added to the mixture and the partially fermented milkproduct was heated to a temperature of 75° C. for 15 secs. The heated product, that no longer contained live bacteria, was centrifuged in a MSE coolspin centrifuge for 30 min at 4200 rpm. 50% of the whey was decanted from the product. In this way a concentrated, yoghurt-like product with a dry matter content of 23% and a pH=5.0 was obtained. After 1 week storage at 0.5° C. the product displayed the following characteristics: d.m. content 23% pH 5.0 viscosity at 20° C.:15 (Haake VT 02) The product tasted quite neutral, had a pleasant, smooth mouthfeel, although it was a bit slimy.

IC: A mixture of skimmed milk and 15 wt % of centrifuged denatured whey protein with a mean particle size, when measured dry, of 0.8 μm, prepared according to the process described in EP 347 237, was made. This mixture was fermented and treated in the same way as described in IB. In this way a product was obtained that displayed the following characteristics: d.m. content 20% pH 4.9 pH, after storage at 0.5° C. for 1 week:4.8 viscosity at 20° C.:47 (Haake VT 02)

The taste of this product was the same as that of product IB. However, the typical aftertaste, that is connected with the denatured whey protein, was almost completely masked.

EXAMPLE II

Preparation of French Dressing

A water phase (ambient T) containing water, sugar, cider, vinegar, fructose, brine, flavour and tomato paste is mixed with an oil phase, containing oil, xanthan gum, prop.glyc.alg., EDTA and onion powder using an ultra turrax mixer. After 10 min. mixing a second oil phase is added, containing oil, mustard flower, paprika oleoresin, garlic concentrate and another mixing for 5 min. with the ultra turrax is carried out. The obtained mixture is homogenized, using a Prestomill: setting 8 slit with 0°. This way an emulsion is obtained with a droplet size of 10–12 μm. At this stage the product of example IB is brought into the mixture and mixing is performed (5 min Ultra Turrax). The pH is adjusted to 3.1–3.3 and another homogenisation takes place with the Prestomill: setting 3 slit width 400°. This way the following french dressing is obtained, which has excellent taste properties.

| Soy bean oil: | 15.7 wt % |
|---|---|
| concentrated yoghurt (pH = 5.0) d.m. 23%: | 20.0 |
| water: | 32.8 |
| vinegar | 10.3 |
| HCl | 0.45 |
| sugar | 7.77 |
| Sugar syrup | 7.3 |
| NaCl | 1.38 |
| tomato paste | 3.32 |
| p.g.a./xanthan gum-mixture | 0.64 |
| flavours | 0.28 |

EXAMPLE III

Preparation of spreadable mayonnaise

In a way similar to the method described in example II a mayonnaise with the following composition is produced:

| Sunflower oil | 40.0% |
|---|---|
| Whole egg | 14.0 |
| Wine vinegar (10%) | 3.0 |
| Salt | 1.6 |
| Inst. clear gel | 1.5 |
| Papr. oleo resin | 0.003 |
| β-carotene (0.4%) | 0.1 |
| Concentr. yoghurt; d.m. 23% pH 5.0 | 30.0 |
| Blue cheese | 0.25 |
| Cheese | 0.5 |
| GFS gum | 0.2 |
| Lacprodan 80 | 2.0 |
| Lactose | 2.5 |
| Water | to 100% |
| pH: 3.7 (with 18% HCl) | |

EXAMPLE IV

Preparation of a topping (for spaghetti)

A topping was made in a way similar to the methods of examples II and III, which had the following composition:

| Butter fat | 25.0% |
|---|---|
| Olive oil | 5.0 |
| Tomato past (28% d.m.) | 30.0 |
| Conc. yoghurt d.m. 23% pH 5.0 | 8.0 |
| Parmesan cheese | 10.0 |
| gelatin (UG 719 N) | 1.0 |
| Lacprodan 80 | 1.5 |
| Salt | 1.2 |
| Bouillon powder | 0.7 |
| Onion powder | 0.2 |
| K-sorbate | 0.2 |
| Remirise AP | 0.5 |
| Water | to 100% |
| pH 4.7 (no correction) | |

EXAMPLE V

Preparation of ice-cream.

A water continuous emulsion was made of the ingredients mentioned in table I in the given amounts.

TABLE I

| Butter fat | 1.8 |
|---|---|
| yogh-like prod. of example IB | 8.0 |
| SMP | 10.0 |
| Sugar | 14.0 |
| glucose-solids | 4.0 |
| stabiliser/emulsifier | 0.8 |
| flavour | 0.04 |
| water | balance to 100% |

The emulsion was homogenised at 20° C. using a single stage Rannie (P=150–180 bar) homogeniser. The homogenised product was pasteurised at 85° C. for 20 secs. The pasteurised product was cooled in a heat-exchanger to 8° C. The cooled product was left overnight at this temperature. The mixture so obtained was fed to a continuous ice-cream freezer (MFSO-Technoho), while air was introduced, to cool the product to −5° C. This way an excellent ice-cream was obtained, that showed an overrun of 100%, an acceptable texture and an excellent taste (not acidic, no after taste). The melt down of this product was slightly better, than the melt down of an ice-cream, that contained 1.5 wt % butterfat and 8.5 wt % denatured, whey protein.

EXAMPLE VI

Preparation of frozen desert

Five different wate continuous emulsions were prepared with the compositions, mentioned in table II.

TABLE II

| composition | 1 | 2 | 3 | 4 | 5 |
|---|---|---|---|---|---|
| Butterfat | 10 | 2 | 2 | 2 | 2 |
| SMP | 63 | 63 | 63 | 63 | 63 |
| Saccharose | 27 | 27 | 27 | 27 | 27 |
| Flavour | 0.02 | 0.02 | 0.02 | 0.02 | 0.02 |
| casein disp. (ex IB) | — | 8.00 | — | 4.00 | — |
| denat.whey protein disp.* | — | — | 8.00 | 4.00 | — |
| mixture of ex.IC | — | — | — | — | 8.00 |

*made according to process of EP 347.237

From these compositions ice creams were made in the usual way (cf. ex V). The taste of these products were tested by a panel.

The results being:

mixt 1—mixt 2—mixt 5 > mixt 4 > > mixt 3.

The product of composition 5 did not show an after taste, whereas the creaminess was improved, compared with the products of composition 4 or of composition 3. Therefore it is advantageous to add denatured whey protein to the milk before the fermentation is performed.

We claim:

1. A mixture of (a) a concentrated casein containing dispersion, wherein the casein is from a source selected from the group consisting of yoghurt and/or quark, wherein the casein is substantially aggregated, which dispersion has a dry matter content of 10–40 wt %, a pH of 4.8–5.2, and a weight ratio protein:lactose in the dispersion varying from 2:1 to 10:1, which dispersion also is free from live, milk fermenting bacteria, and (b) a denatured protein particle-containing aqueous dispersion, which contains particles with a mean particle size, when measured dry, of 2.0–20 micrometer.

2. The mixture according to claim 1 wherein the dry matter content varies from 10 to 30 wt %.

3. The mixture according to claim 1 wherein the pH of the concentrated casein containing dispersion is 4.9–5.1.

4. The mixture according to claim 1 wherein the weight ratio protein:lactose in the concentrated casein containing dispersion is 2.5:1 to 6:1.

5. The mixture according to claim 1 wherein the weight ratio casein:non-casein protein is 0.3–3.0.

6. The mixture according to claim 1 further comprising a gelling agent.

7. A food product, comprising (a) a concentrated substantially aggregated casein-containing dispersion, said dispersion having a dry matter content of 10–80 wt %, a pH of 4.8–5.2 and a weight ratio protein:lactose of 2:1 to 10:1, said dispersion being free from live, milk fermenting bacteria and (b) a denatured protein particle-containing aqueous dispersion, which contains particles with a mean particle size, when measure dry, of 2.0–20 micrometer, said food product being selected from the group consisting of toppings, dressings, mayonnaise, low fat spreads, zero fat spreads and frozen desserts.

8. The food product according to claim 7 wherein the dry matter content varies from 10 to 30 wt %.

9. The food product according to claim 7 wherein the concentrated casein containing dispersion has a pH from 4.9–5.1.

10. The food product according to claim 7 wherein the concentrated casein containing dispersion has a weight ratio protein:lactose of 2.5:1 to 6:1.

11. The food product according to claim 7 wherein the concentrated casein containing dispersion has a weight ratio casein:non-casein protein from 0.3 to 3.0.

12. The food product according to claim 7 wherein said foodstuff further contains a gelling agent.

13. The food product according to claim 7 being a topping comprising 2 to 60 wt % of said dispersions.

14. The food product according to claim 7 being a dressing comprising 5 to 50 wt % of said dispersions.

15. The food product according to claim 7 being a mayonnaise comprising 5 to 60 wt % of said dispersions.

16. The food product according to claim 7 being a low fat spread comprising 5 to 80 wt % of said dispersions.

17. The food product according to claim 7 being a zero fat spread comprising 5 to 90 wt % of said dispersions.

18. The food product according to claim 7 being a frozen dessert comprising 2 to 85 wt % of said dispersions.

* * * * *